United States Patent [19]
Takada et al.

[11] Patent Number: 6,075,657
[45] Date of Patent: Jun. 13, 2000

[54] WIDE-ANGLE LENS SYSTEM

[75] Inventors: Katsuhiro Takada, Hidaka; Takanori Yamanashi, Kokubunji, both of Japan

[73] Assignee: Olympus Optical Co., Ltd., Tokyo, Japan

[21] Appl. No.: 09/048,221

[22] Filed: Mar. 26, 1998

[30] Foreign Application Priority Data

Sep. 2, 1997 [JP] Japan .................................. 9-251452

[51] Int. Cl.[7] .................................................. G02B 13/04
[52] U.S. Cl. ........................................... 359/749; 359/754
[58] Field of Search .................................... 359/749–753, 359/784, 771, 763, 754–756, 680–682, 689

[56] References Cited

U.S. PATENT DOCUMENTS

| | | | |
|---|---|---|---|
| 4,061,421 | 12/1977 | Nakagawa | 359/749 |
| 4,163,603 | 8/1979 | Tsunashima | 359/749 |
| 4,431,273 | 2/1984 | Nakamura | 359/708 |
| 5,159,493 | 10/1992 | Tsutsumi . | |

FOREIGN PATENT DOCUMENTS

| | | |
|---|---|---|
| 63-149618 | 6/1988 | Japan . |
| 64-61714 | 3/1989 | Japan . |
| 4-118612 | 4/1992 | Japan . |

*Primary Examiner*—Georgia Epps
*Assistant Examiner*—Jordan M. Schwartz
*Attorney, Agent, or Firm*—Pillsbury Madison & Sutro LLP

[57] ABSTRACT

A wide-angle lens system which has a long back focal length comprising a first lens unit having a negative power, a second lens unit having a positive power and a third lens unit having a positive power: the first lens unit being composed of a 1-1 positive lens unit which is composed only of a positive lens component and a 1-2 negative lens unit which is composed only of negative lens components, the third lens unit being composed of a 3-1 subunit which comprises at least a negative lens component and a 3-2 positive subunit which comprises at least a negative lens component, the 3-1 subunit being composed of a first negative lens component and a second positive lens component, and the 3-2 subunit being composed of a third negative lens component and a fourth positive lens component.

38 Claims, 3 Drawing Sheets

WIDE-ANGLE LENS SYSTEM

BACKGROUND OF THE INVENTION a) Field of the Invention

The present invention relates to a wide-angle lens system which has a field angle on the order of 50° to 90°, an F number on the order of 4.0 or high brightness and a long back focal length, and is optimum for use in the electronic cameras and video cameras which use image pickup tubes and solid-state image pickup devices.

b) Description of the Prior Art

For the electronic cameras and video cameras which use image pickup tubes and image pickup devices, it is necessary to dispose optical members such as low pass filters and infrared cut filters between lens systems and surfaces of the image pickup devices. Therefore, lens systems to be used in these cameras must have back focal lengths which are long as compared with focal lengths thereof.

In case of an image pickup system which uses a color separating optical system for picking up three colors of R, B and G with a plurality of image pickup devices to improve qualities of colored images, it is necessary to interpose optical elements such as mirrors and prisms for splitting an optical path in addition to the optical elements such as the low pass filter, whereby a lens system must have a longer back focal length.

Lens systems disclosed by Japanese Patents Kokai Publication No. Sho 63-149618, Kokai Publication No. Hei 1-61714 and Kokai Publication No. Hei 4-118612 are known as conventional examples of wide-angle lens systems which have field angles not smaller than 50° and back focal lengths long enough for interposing optical elements such as mirrors and prisms for splitting optical paths.

In the recent years where progress has been made in manufacturing technologies, image pickup devices which are used in electronic cameras and video cameras have been shifted from image pickup tubes mainly to solid-state image pickup devices. Solid-state image pickup devices which have a large number of pixels are available.

Accordingly, cameras which use solid-state image pickup devices are now usable for printing purposes though these cameras were not used conventionally for a reason that images obtained with these cameras were lower in quality than those of images obtained with silver salt cameras. However, it is difficult to manufacture a compact image pickup device even with the recent manufacturing technologies since it requires pixels in a number equal or larger than that of pixels specified by standards for televisions such as highvision which forms highly minute images.

Therefore, electronic cameras are being developed by arranging larger numbers of pixels on enlarged image pickup devices without changing a size of each pixel.

However, when enlarged image pickup devices can be manufactured from a single wafer which has a definite area and require a higher manufacturing prime cost. Accordingly, attempts have been made to accomplish both a compact configuration and a reduction of manufacturing costs at the same time by reducing the size of pixels and developing an image pickup device on which a large number of pixels are arranged.

However, the reduction in a size of pixels to be arranged on an image pickup device results in enhancement of the so-called Nyquist frequency, thereby requiring a photographic lens system which has extremely high optical performance.

On the other hand, the electronic cameras and video cameras which use electronic image pickup devices require an optical system having a long back focal length, thereby obliging to use a retrofocus type optical system which has a negative-positive power distribution in order from the object side, or a negative-positive power distribution asymmetrical with regard to a stop. As a result, the optical system can hardly correct offaxial aberrations such as distortion and astigmatism, a paraxial light bundle is made a diverging light bundle by a front lens group and spherical aberration is produced by a rear lens group, thereby making it difficult to obtain a bright lens system.

Above all, a lens system which has a wider photographing field angle has a back focal length having a higher ratio relative to a focal length thereof, thereby making it necessary to strengthen powers of a negative lens group and a positive lens group or widening an airspace between the negative lens group and the positive lens group.

The former method further aggravates aberrations, thereby making it difficult to maintain high optical performance of the lens system. Further, the latter method enlarges the lens system. In order to obtain a lens system which has a relatively compact size, a long back focal length and high optical performance, it is therefore necessary to select an adequate negative-positive power distribution as well as an adequate value of distance between principal points.

Since problems of color reproducibility, color moiré, etc. are more serious as an image pickup system is configured to reproduce images of higher qualities, a multi-plate camera represented by the so-called three-plate camera which picks up the three primary colors RGB with three image pickup devices is more desirable than the so-called single-plate camera which uses a single image pickup device on which color filters are arranged in a mosaic or stripes.

For this reason, it is necessary to interpose a color separating optical system between a photographic lens system and image pickup devices, thereby requiring a much longer back focal length and making it more difficult to design a photographic lens system.

Lens systems disclosed by Japanese Patents Kokai Publication No. Sho 63-149618 and Kokai Publication No. Hei 1-61714 are known as conventional examples of photographic lens systems which are used in such a image pickup system. These lens systems do not sufficiently correct spherical aberration and astigmatism. Though a lens system which is disclosed by Japanese Patent Kokai Publication No. Hei 4-118612 which is known as another conventional example has remarkably high optical performance, this lens system is composed of a remarkably large number of lens elements, whereby the lens system is large as compared with a focal length thereof and is contrary to the object described above of an image pickup system which is configured compact by reducing a size of image pickup devices.

SUMMARY OF THE INVENTION

A primary object of the present invention is to provide a wide-angle lens system which has a field angle on the order of 50° to 60°, an F number on the order of 4.0, a back focal length to arrange optical elements such as low pass filters and infrared cut filters between image pickup devices and the lens system as well as optical path splitting members for forming an image of the three primary colors of RGB with a plurality of image pickup devices and extremely high optical performance, and is optimum for use in electronic cameras, video cameras, etc. which use compact image pickup devices on which large numbers of pixels are arranged.

The wide-angle lens system according to the present invention which has a first composition consists, in order from the object side, of a first lens unit which has a negative power as a whole, a second lens unit which has a positive power as a whole and a third lens unit which has a positive power as a whole: the first lens unit being composed, in order from the object side, of a 1-1 subunit which is composed only of a positive lens component or positive lens components and has a positive power, a 1-2 subunit which is composed only of a negative lens component or negative lens components and has a negative power, and the third lens unit being composed, in order from the object side, of a 3-1 subunit which comprises at least a negative lens component and a 3-2 subunit which comprises at least a negative lens component and has a positive power as a whole, the 3-1 subunit being composed, in order from the object side, of a first lens component which is composed only of a negative lens element or negative lens elements and has a negative power and a second lens component which has a positive power as a whole, and the 3-2 subunit being composed, in order from the object side, of a third lens component which has a negative power as a whole and a fourth lens component which has a positive power as a whole.

The wide-angle lens system according to the present invention which has a second composition consists, in order from the object side, of a first lens unit which has a negative power as a whole, a second lens unit which has a positive power as a whole and a third lens unit which has a positive power as a whole: the first lens unit being composed, in order from the object side, of a 1-1 subunit which is composed only of a positive lens component or positive lens components and has a positive power and a 1-2 subunit which is composed only of a negative lens component or negative lens components and has a negative power, the third lens unit being composed, in order from the object side, of a 3-1 subunit which comprises at least a negative lens component and a 3-2 subunit which comprises at least a negative lens component and has a positive power as a whole, the 3-1 subunit being composed, in order from the object side, of a first lens component which is composed only of a negative lens component or negative lens components and has a negative power, and a second lens component which has a positive power as a whole, and the 3-2 subunit being composed, in order from the object side, of a third lens component which has a positive power as a whole, a fourth lens component which has a negative power as a whole and a fifth lens component which has a positive power as a whole.

The wide-angle lens system according to the present invention which has a third composition consists, in order from the object side, of a first lens unit which has a negative power as a whole, a second lens unit which has a positive power as a whole and a third lens unit which has a positive power as a whole: the first lens unit being composed, in order from the object side, of a 1-1 subunit which is composed only of a positive lens component or positive lens components and has a positive power, a 1-2 subunit which is composed only of a negative lens component or negative lens components and has a negative power, the third lens unit being composed, in order from the object side, of a 3-1 subunit which comprises at least a negative lens component and a 3-2 subunit which comprises at least a negative lens component and has a positive power as a whole, the wide-angle lens system satisfying conditions (1) through (6) which are mentioned below:

(1) $0.2 < |f_1/f_3| < 0.8$
(2) $0.01 < |f/f_2| < 0.7$
(3) $0.01 < |f_1/f_{1-1}| < 0.5$
(4) $0.7 < |f_{1-2}/f_1| < 1.0$
(5) $|f_3/f_{3-1}| < 0.6$
(6) $0.5 < |f_3/f_{3-2}| < 0.95$

DETAILED DESCRIPTION OF THE PREFERRED EMBODIMENTS

Figure 1:
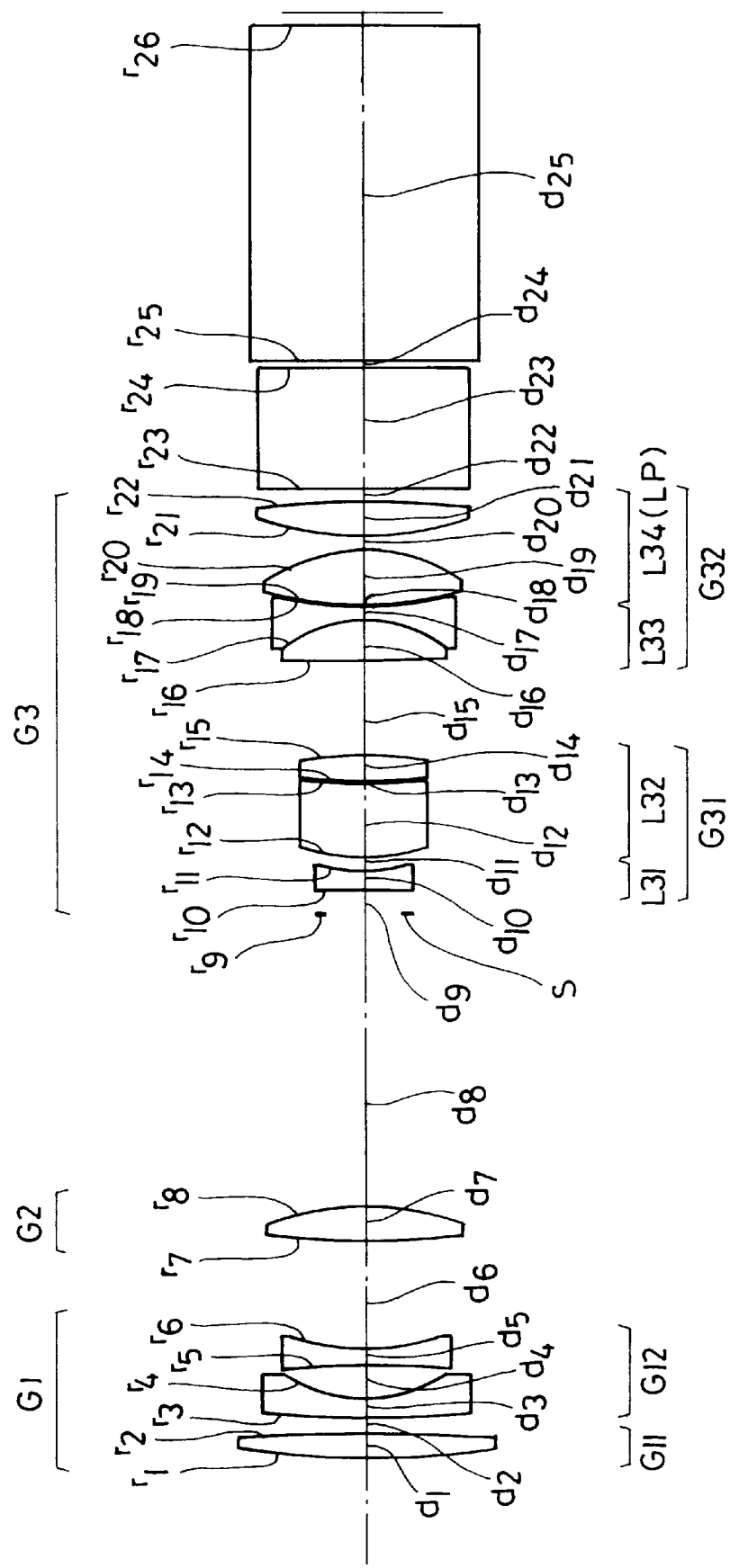
FIG. 1 shows a sectional view illustrating a composition of first through fourth embodiments of the lens system according to the present invention.

The wide-angle lens system according to the present invention which has a first composition is characterized in that it consists, in order from the object side as shown in FIG. 1 for example, of a first lens unit G1 which has a negative power as a whole, a second lens unit G2 which has a positive power as a whole and a third lens unit G3 which has a positive power as a whole: the first lens unit G1 being composed, in order from the object side, of a 1-1 subunit G11 which is composed only of a positive lens component or positive lens components and has a positive power and a 1-2 subunit G12 which is composed only of a negative lens component or negative lens components and has a negative power, the third lens unit G3 being composed, in order from the object side, of a 3-1 subunit G31 which comprises at least a negative lens component and a 3-2 subunit G32 which has at least a negative lens component and has a positive power, and the 3-1 subunit G31 of the third lens unit G3 being composed, in order from the object side, of a first lens component L31 which is composed only of a negative lens component and has a negative power and a second lens component L32 which has a positive power as a whole, and the 3-2 subunit G32 being composed, in order from the object side, of a third lens component L33 which has a negative power as a whole and a fourth lens component L34 which has a positive power as a whole.

When a color separating optical system such as a color separating prisms is used, it is general to perform color separations using a dichroic film which controls wavelength spectra of a light transmitted for effective use of rays. However, it is desirable for obtaining uniform color separations within a screen to nearly equalize inclinations and spreads of light bundles incident on the color separating optical system at different locations within the screen since wavelength spectra which transmit through the dichroic film are different dependently on inclinations of rays incident on the dichroic film. In other words, it is desirable that an offaxial principal ray is incident on the color separating optical system at an angle which is the same as that of an optical axis and that an offaxial light bundle spreads revolutionally symmetrically with regard to the principal ray. It is therefore desirable that a photographic lens system has an exit pupil nearly at infinite distance, but color signals which are not problematic for practical use can be obtained by disposing a white shading correcting means in an electric circuit after receiving the light bundle with an image pickup device so far as the photographic lens system has an exit pupil at a distance which is adequately long.

Unlike a silver salt camera or the like, an electronic image pickup device allows rays to be imaged on a photoelectric conversion surface of each pixel through members such as a color filter disposed at an adequate interval from the photoelectric conversion surface and a micro lens for condensing rays efficiently onto the photoelectric conversion surface, and the photoelectric surface and each of the members are arranged so as to correspond at one to one to each other for each pixel. When a center ray of a light bundle is incident obliquely onto the image pickup device at an inclination angle of incidence which is large as compared with a size of each pixel and the interval between the member and the photoelectric conversion surface which are arranged as described above, a light bundle or a portion thereof which has passed through the member protrudes from the photoelectric conversion surface corresponding thereto and does not contribute to conversion into an electric signal or incident on another pixel, thereby producing non-uniformity in brightness or spurious colors.

For correcting the defect described above, there is adopted means which produces an adequate deviation between the optical member and the pixel corresponding thereto dependently on a location of the exit pupil of the photographic lens system. Though this means controls angles of emergence of rays by locating the location of the exit pupil within an adequate range, a location of the exit pupil which is extremely close to an image surface imposes stricter restrictions on design and is undesirable for manufacturing an image pickup device which is to be used versatilely or when photographic lens systems are to be used in exchange with each other.

For this reason, it is desirable to allow a light bundle to be incident on an electronic image pickup device so that its center ray has an inclination angle not exceeding an adequate angle. In other words, it is desirable that a photographic lens system has an exit pupil which is located at an adequately long distance.

Due to the requisites for the color separating optical system and the requirements for the image pickup device described above, it is desirable that a photographic lens system has an exit pupil at a position which is located at a nearly infinite distance or an adequately long distance and it is necessary to adequately strengthen a positive power of a rear lens group in case of the retrofocus type.

An object of the present invention is to provide a lens system which has a long back focal length, so that a color separating optical system which splits an optical path for a plurality of image pickup devices can be disposed between a photogaphic lens system and the image pickup devices as shown, for example, in FIG. 1.

In order to increase the back focal length of a retrofocus type lens system which comprises a negative front lens group and a positive rear lens group without increasing its total length, it is therefore necessary from a simple paraxial formula to strengthen a positive power of a rear lens group.

From viewpoints of any of the characteristics of the color separating optical system, the structure of the electronic image pickup device and the optical paraxial condition, it is necessary to strengthen a negative power of a front lens group and a positive power of a rear lens group in a retrofocus type lens system which has the negative-positive power distribution.

Though the present invention has the primary object to provide an optical system or an image pickup system optimum for use with multi-plate type cameras which pick up images of high quality, or the three primary colors RGB with a plurality of image pickup devices, the lens system according to the present invention is configured, as described above, so as to have a composition which is suited best for use with image pickup systems in which optical members such as an optical path splitting prism are disposed on the image side of photographic lens systems for performing automatic focusing and automatic exposure as discussed above and image pickup systems in which optical members requiring long optical paths are disposed between photographic lens systems and image surfaces in addition to low pass filters and infrared cut filters such as image pickup systems in which optical members such as optical path splitting prisms are disposed on the image side of photographic lens systems for the so-called single-lens type view finders.

A retrofocus type lens system such as that described above can hardly correct offaxial aberrations such as distortion and astigmatism since the lens system has a power distribution which is asymmetrical with regard to a stop. When a positive rear lens group has a strong power, the lens system allows the rear lens group to produce remarkable spherical aberration and can hardly correct this aberration since a negative front lens group diverges an axial light bundle. As the negative front lens group and the positive rear lens group have stronger powers, the lens system can correct the aberrations more hardly, aberrations, negative distortion which is produced by the front lens group and negative spherical aberration which is produced by the rear lens group in particular.

For this reason, the lens system according to the present invention is composed, in order from the object side, of the first lens unit G1 which has a strong negative power, the second lens unit G2 which has a positive power and has a function to lower paraxial rays, and the third lens unit G3 which has a positive power and has a function to adjust an imaging point and a location of an exit pupil so that aberrations can be corrected favorably by the second lens unit having the positive power though the lens system is macroscopically retrofocus type which has a negative-positive power distribution.

When the second lens unit G2 which has the positive power is disposed after the first lens unit G1, however, it is difficult to prolong a back focal length.

Therefore, the third lens unit G3 of the lens system according to the present invention is composed, in order from the object side, of the 3-1 subunit G31 which comprises at least a negative lens component, and the 3-2 subunit G32 which comprises at least a negative lens component, and has a positive power. It is desirable to configure the 3-1 subunit G31 of the third lens unit so as to have a negative power or a positive power which is weaker than that of the 3-2 subunit G32 so that the lens system has a power distribution close to that of the retrofocus type while maintaining a positive power required for imaging.

Further, the first lens unit G1 which has the negative power produces negative distortion and the third lens unit G3 which has the positive power also produces negative distortion, thereby tending to aggravate negative distortion in the lens system as a whole. This tendency is made more remarkable by strengthening the negative power of the first lens unit G1 and the positive power of the third lens unit G3. In order to correct this negative distortion, it is necessary to produce positive distortion by distributing a positive power in the first lens unit G1 or a negative power in the third lens unit G3.

In the lens system according to the present invention which has a wide field angle, rays which are to form images at marginal portions of a screen are higher on the first lens unit G1 than those on the other lens unit, whereby the first lens unit G1 produces remarkable negative distortion. Therefore, it is possible to prevent optical performance from being degraded due to a relative arrangement error between the first lens unit G1 and the subsequent lens units by distributing a positive power in the first lens unit G1 to reduce distortion to be produced by the first lens unit G1.

In order to configure the lens system according to the present invention so as to have a long back focal length, the first lens unit G1 must have a negative power of an adequate strength and it is required that a positive power to be distributed in this lens unit is relatively weak but capable of correcting distortion sufficiently. It is therefore desirable to distribute a positive power at a most object-side location in the first lens unit where offaxial rays are highest.

For this reason, the first lens unit G1 of the lens system according to the present invention is composed, in order from the object side, of the 1-1 subunit G11 which is composed only of a positive lens component or positive lens components and has the positive power, and the 1-2 subunit G12 which is composed only of a negative lens component or negative lens components and has the negative power.

In order to obtain higher optical performance of the lens system according to the present invention by making compatible reservation of a long back focal length and correction of aberrations, it is desirable to compose the 3-1 subunit G31 of the third lens unit G3, in order from the object side, of the first lens component L31 consisting only of a negative lens component or negative lens components and the second lens component L32 having a positive power as a whole, and compose the 3-2 subunit G32, in order from the object side, of the third lens component L33 having a negative power as a whole and the fourth lens component L34 having a positive power as a whole. That is to say, it is desirable for maintaining a long back focal length to select a retrofocus type lens arrangement for each of the 3-1 subunit G31 and the 3-2 subunit G32 of the third lens unit G3.

In order to correct offaxial aberrations such as astigmatism and spherical aberration with good balance while maintaining an extremely long back focal length in a lens system which has a wide field angle in particular, it is desirable to compose a 3-2 subunit of a third lens unit, in order from the object side, of a third lens component which has a positive power as a whole, a fourth lens component which has a negative power as a whole and a fifth lens unit which has a positive power as a whole so that the 3-2 subunit has a triplet type power distribution.

Figure 3:
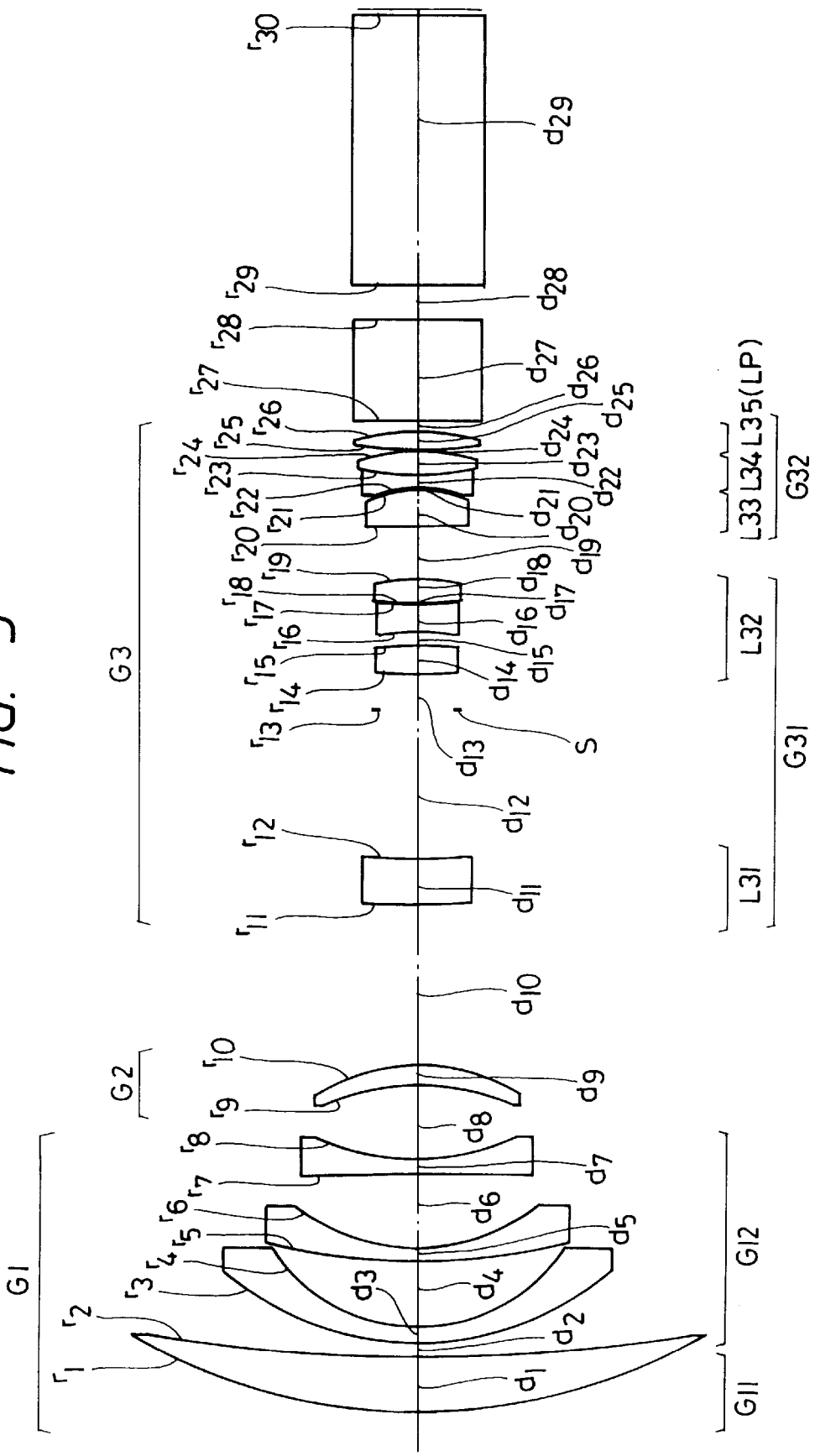
FIG. 3 shows a sectional view illustrating a composition of a sixth embodiment of the lens system according to the present invention.

Speaking concretely, the lens system according to the present invention which has a second composition is characterized in that it consists, in order from the object side as shown in FIG. 3 for example, of a first lens unit G1 which has a negative power as a whole, a second lens unit G2 which has a positive power as a whole and a third lens unit G3 which has a positive power as a whole: the first lens unit G1 being composed, in order from the object side, of a 1-1 subunit G11 which is composed only of a positive lens component or positive lens components and has a positive power and a 1-2 subunit G12 which is composed only of a negative lens component or negative lens components and has a negative power, the third lens unit G3 being composed, in order from the object side, of a 3-1 subunit G31 which comprises at least a negative lens component, and a 3-2 subunit G32 which comprises at least a negative lens component and has a positive power as a whole, the 3-1 subunit G31 of the third lens unit being composed, in order from the object side, of a first lens component L31 which is composed only of a negative lens component or negative lens components and has a negative power and a second lens component L32 which has a positive power as a whole, and the 3-2 subunit G32 of the third lens unit being composed, in order from the object side, of a third lens component L33 which has a positive power as a whole, a fourth lens component L34 which has a negative power as a whole and a fifth lens component L35 which has a positive power as a whole.

The lens system according to the present invention which has a third composition consists, in order from the object side, of a first lens unit G1 which has a negative power as a whole, a second lens unit G2 which has a positive power as a whole and a third lens unit G3 which has a positive power as a whole: the first lens unit G1 being composed, in order from the object side, of a 1-1 subunit G11 which is composed only of a positive lens component or positive lens components and has a positive power and a 1-2 subunit G12 which is composed only of a negative lens component or negative lens components and has a negative power, and the third lens unit G3 being composed, in order from the object side, of a 3-1 subunit G31 which comprises at least a negative lens component, and a 3-2 subunit G32 which comprises at least a negative lens component and has a positive power, and is configured to satisfy conditions (1) through (6) which are listed below:

(1) $0.2<|f_1/f_3|<0.8$
(2) $0.01<|f/f_2|<0.7$
(3) $0.01<|f_1/f_{1-1}|<0.5$
(4) $0.7<|f_{1-2}/f_1|<1.0$
(5) $|f_3/f_{3-1}|<0.6$
(6) $0.5<|f_3/f_{3-2}|<0.95$ wherein the reference symbol f represents a focal length of the lens system as a whole, the reference symbols $f_1$, $f_2$ and $f_3$ designate focal lengths of the first lens unit G1, the second lens unit G2 and the third lens unit G3 respectively, the reference symbols $f_{1-1}$ and $f_{1-2}$ denote focal lengths of the 1-1 subunit G11 and the 1-2 subunit G12 respectively of the first lens unit G1, and the reference symbols $f_{1-3}$ and $f_{3-2}$ represent focal lengths of the 3-1 subunit G31 and the 3-2 subunit G32 respectively of the third lens unit G3.

The conditions (1) and (2) mentioned above define a power distribution among the first lens unit G1, the second lens unit G2 and the third lens unit G3 as a macroscopic power distribution.

If $|f_1/f_3|$ has a value which is smaller than the lower limit of 0.2 of the condition (1), the third lens unit G3 will have an insufficient power, thereby making it difficult to locate an exit pupil at a nearly infinite or adequately long distance, and an airspace between the first lens unit and the third lens unit must be widened for reserving a power required for the lens system as a whole, thereby enlarging the lens system. If $|f_1/f_3|$ has a value which is larger than the upper limit of 0.8 of the condition (1), in contrast, the first lens unit G1 will have an insufficient negative power, thereby making it difficult to reserve a required back focal length in the lens system.

If $|f/f_2|$ has a value which is smaller than the lower limit of 0.01 of the condition (2), paraxial rays cannot be sufficiently lowered by the second lens unit G2, thereby making it difficult to correct aberrations produced by the third lens unit G3 or the third lens unit G3 must have a complicated composition to suppress aberrations to be produced by this lens unit. Further, such a small value of $|f/f_2|$ makes it impossible to correct distortion produced by the first lens unit G1 with the second lens unit G2 and is undesirable for correction of aberrations.

If $|f/f_2|$ has a value which is larger than the upper limit of 0.7 of the condition (2), in contrast, the second lens unit G2 will have too strong a power, thereby making it difficult to reserve a long back focal length in the lens system.

Further, it is desirable to use at least two negative lens components each having a surface which has a stronger negative power on the image side in the 1-2 subunit G12 of the first lens unit, and these two lens components may be negative meniscus or biconcave lens components. It is desirable to select this composition for the 1-2 subunit G12 so that it has a function to cancel astigmatism produced by the 1-1 subunit G11.

Furthermore, it is desirable to distribute powers between the 1-1 subunit and the 1-2 subunit of the first lens unit of the lens system according to the present invention so as to satisfy the conditions (3) and (4) mentioned above.

If $|f_1/f_{1-1}|$ has a value which is smaller than the lower limit of 0.01 of the condition (3), the 1-1 subunit G11 has too weak a positive power and undercorrects distortion, whereby remarkable negative distortion remains in the first lens unit. If $|f_1/f_{1-1}|$ has a value which is larger than the upper limit of 0.5 of the condition (3), in contrast, the 1-1 subunit will have too strong a positive power, whereby the first lens unit G1 can hardly have a negative power which is sufficient for reserving a required back focal length.

If $|f_{1-2}/f_1|$ has a value which is smaller than the lower limit of 0.7 of the condition (4), the 1-2 subunit G12 will have too strong a negative power, thereby making it difficult to correct distortion favorably even with the 1-1 subunit G11. If $|f_{1-2}/f_1|$ has a value which is larger than the upper limit of 1.0 of the condition (4), it will be difficult to obtain a negative power of the first lens unit G1 which is sufficient for reserving the required back focal length.

Moreover, it is desirable to distribute powers between the 3-1 subunit G31 and the 3-2 subunit G32 of the third lens unit of the lens system according to the present invention so as to satisfy the conditions (5) and (6) mentioned above.

If $|f_3/f_{3-1}|$ has a value which is larger than the upper limit of 0.6 of the condition (5), most of a positive power required for the third lens unit G3 will be shared by the 3-1 subunit G31 when the 3-1 subunit G31 has a positive power, thereby making it difficult to reserve the required back focal length in the lens system. When the 3-1 subunit G31 has a negative power, paraxial rays will be high on the 3-2 subunit G32, thereby undesirably aggravating spherical aberration.

If $|f_3/f_{3-2}|$ has a value which is smaller than the lower limit of 0.5 of the condition (6), the 3-2 subunit G32 will have a weak positive power and the 3-1 subunit G31 must have a strong positive power for maintaining a power required for imaging, thereby making it difficult to reserve the required back focal length and undesirably aggravating curvature of a meridional image surface. If $|f_3/f_{3-2}|$ has a value which is larger than the upper limit of 0.95 of the condition (6), in contrast, the 3-2 subunit G32 will have too strong a positive power, thereby making it difficult to balance a back focal length with a location of an exit pupil, and degrading imaging performance due to aggravation of spherical aberration and coma.

In addition, it is desirable to adjust a location of an exit pupil with a lens component LP which is composed only of a positive lens element or positive lens elements and is disposed on the image side in the 3-2 subunit G32 and configure this lens component LP so as to have a focal length $f_P$ which satisfies the following condition (7):

(7) $0.3 < |f_P/f_3| < 1.5$

If $|f_P/f_3|$ has a value which is larger than the upper limit of 1.5 of the condition (7), the lens component LP will have a weak positive power, thereby making it difficult to locate an exit pupil at a nearly infinite or adequately long distance. If $|f_P/f_3|$ has a value which is smaller than the lower limit of 0.3 of the condition (7), in contrast, the lens component LP will have too strong a positive power, thereby making it difficult to balance a back focal length with a location of an exit pupil, and degrading imaging performance due to aggravation of spherical aberration and coma.

It is needless to say that the lens system according to the present invention which has the first composition or the second composition can have more favorable optical performance when it is configured so as to satisfy the conditions (1) and (2), the conditions (3) and (4), the conditions (5) and (6) or the condition (7).

In order to prevent enlargement of the lens system according to the present invention which has the first composition, the second composition or the third composition, it is desirable to dispose the first lens unit G1, the second lens unit G2 and the third lens unit G3 so as to satisfy the following conditions (8) and (9):

(8) $0.5 < |e_{12}/f| < 3.5$ (9) $3 < |e_{23}/f| < 10$ wherein the reference symbol $e_{12}$ and $e_{23}$ represent a distance between principal points of the first lens unit G1 and the second lens unit G2, and a distance between the second lens unit G2 and the third lens unit G3 respectively.

If $|e_{12}/f|$ has a value which is smaller than the lower limit of 0.5 of the condition (8), it will be necessary to strengthen the negative power of the first lens unit G1 for reserving the required back focal length, thereby undesirably aggravating distortion. If $|e_{12}/f|$ has a value which is larger than the upper limit of 3.5 of the condition (8), paraxial rays will be too high on the second and subsequent lens units, thereby making it difficult to correct remarkable negative spherical aberration.

If $|e_{23}/f|$ has a value which is smaller than the lower limit of 3 of the condition (9), it will be difficult to obtain a wide photographic field angle. If $|e_{23}/f|$ has a value which is larger than the upper limit of 10 of the condition (9), in contrast, the lens system will undesirably be enlarged.

For the lens system according to the present invention which has any of the compositions described above, it is more desirable to replace the conditions (1) through (4) and the conditions (6) through (9) with the following conditions (1-1) through (4-1) and conditions (6-1) through (9-1) respectively:

(1-1) $0.3 < |f_1/f_3| < 0.7$ (2-1) $0.03 < |f/f_2| < 0.6$ (3-1) $0.05 < |f_1/f_{1-1}| < 0.2$ (4-1) $0.8 < |f_{1-2}/f_1| < 0.9$ (6-1) $0.6 < |f_3/f_{3-2}| < 0.85$ (7-1) $0.5 < |f_P/f_3| < 1.25$ (8-1) $0.5 < |e_{12}/f| < 2.8$ (9-1) $4 < |e_{23}/f| < 8$

Further, for the lens system according to the present invention which has any one of the compositions described above and a relatively narrow field angle of 50° to 70° in particular, it is more desirable to replace the condition (1), condition (2) and the conditions (5) through (7) with the following condition (1-2), condition (2-2) and conditions (5-2) through (7-2):

(1-2) $0.25 < |f_1/f_3| < 0.5$
(2-2) $0.2 < |f/f_2| < 0.7$
(5-2) $|f_3/f_{3-1}| < 0.4$
(6-2) $0.7 < |f_3/f_{3-2}| < 0.85$
(7-2) $0.4 < |f_P/f_3| < 0.7$

In order to obtain a lens system which has more favorable optical performance, it is more desirable to replace the above-mentioned conditions (2-2) and (5-2) with the following conditions (2-3) and (5-3) respectively:

(2-3) $0.35 < |f/f_2| < 0.6$
(5-3) $|f_3/f_{3-1}| < 0.35$

For the lens system according to the present invention which has any one of the compositions described above and a relatively wide field angle on the order of 70° to 90° in particular, it is desirable to replace the condition (1), the condition (2) and the conditions (5) through (8) with the following condition (1-4), condition (2-4) and conditions (5-4) through (8-4) respectively:

(1-4) $0.5 < |f_1/f_3| < 0.75$
(2-4) $0.01 < |f/f_2| < 0.20$
(5-4) $0.2 < |f_3/f_{3-1}| < 0.6$
(6-4) $0.5 < |f_3/f_{3-2}| < 0.75$
(7-4) $0.55 < |f_P/f_3| < 1.3$
(8-4) $1.5 < |e_{12}/f| < 3.5$

In order to obtain a lens system which has more favorable performance, it is desirable to satisfy, in place of the condition (2-4), the following condition (2-5):

(2-5) $0.01 < |f/f_2| < 0.10$

Further, it is desirable to use the lens system according to the present invention as a photographic lens system which has a back focal length $f_B$ (optical path length from an image side surface of the lens system to an image surface) and a field angle $2\omega$ satisfying the following conditions (10) and (11) respectively:

(10) $2.0 < f_B/f < 6.0$
(11) $50° < 2\omega < 95°$

If the lower limit of the condition (10) or (11) is exceeded, the lens system will be enlarged. If the upper limit of the condition (10) or (11) is exceeded, aberrations will be unbalanced for reserving the required back focal length, thereby making it impossible to maintain high optical performance.

The lens system according to the present invention is configured to have an exit pupil at a nearly infinite distance or an adequately long distance. Speaking concretely, it is desirable to configure the lens system so as to satisfy the following condition (12):

(12) $|f/E_X| < 0.1$
wherein the reference symbol $E_X$ represents a length from an image side surface of the lens system to an exit pupil of the lens system.

If the upper limit of 0.1 of the condition (12) is exceeded, angles of rays incident on a dichroic film and spectral characteristics will be different between the center and a margin of a screen, when a color separating prism, for example, is disposed between a lens and an image pickup device, thereby making the shading more remarkable. When the color separating prism is not disposed, rays incident on the image pickup device are inclined, thereby producing non-uniformity in brightness and spurious colors or degrading universality.

The lens system according to the present invention which has been described above is configured as a retrofocus type lens system in which an aperture stop is disposed between the second lens unit and the third lens unit or in the third lens unit so that a lens group disposed on the object side of the aperture stop has a negative power, a lens group disposed on the image side has a positive power and the lens system has a long back focal length. Moreover, the back focal length is sufficiently prolonged and optical performance of the lens system is enhanced since aberrations are corrected favorably by disposing the second lens unit which has the positive power in the lens units corresponding to the front lens group of the retrofocus type lens system.

Now, preferred embodiments of the present invention will be described in a form of numeral data which is shown below:

Embodiment 1
$f = 20.000$, F number = 4.29, $2\omega = 59.26°$ $r_1 = 131.6229$
  $d_1 = 3.452$    $n_1 = 1.64419$   $\nu_1 = 34.48$
$r_2 = -398.0699$
  $d_2 = 2.500$
$r_3 = 165.6431$
  $d_3 = 3.000$    $n_2 = 1.81264$   $\nu_2 = 25.43$
$r_4 = 20.4518$
  $d_4 = 4.960$
$r_5 = -107.2113$
  $d_5 = 2.500$    $n_3 = 1.71615$   $\nu_3 = 53.84$
$r_6 = 32.6641$
  $d_6 = 16.187$
$r_7 = 106.9357$
  $d_7 = 5.404$    $n_4 = 1.74435$   $\nu_4 = 52.68$
$r_8 = -38.9972$
  $d_8 = 44.352$
$r_9 = \infty$ (stop)
  $d_9 = 3.541$
$r_{10} = -437.5753$
  $d_{10} = 3.000$   $n_5 = 1.73234$   $\nu_5 = 54.68$
$r_{11} = 23.5478$
  $d_{11} = 1.866$
$r_{12} = 26.5396$
  $d_{12} = 11.670$  $n_6 = 1.81264$   $\nu_6 = 25.43$
$r_{13} = 97.6341$
  $d_{13} = 0.100$
$r_{14} = 102.6840$
  $d_{14} = 4.000$   $n_7 = 1.48915$   $\nu_7 = 70.20$
$r_{15} = -53.1815$
  $d_{15} = 14.333$
$r_{16} = 293.5778$
  $d_{16} = 6.250$   $n_8 = 1.48915$   $\nu_8 = 70.20$
$r_{17} = -19.1241$
  $d_{17} = 2.000$   $n_9 = 1.80642$   $\nu_9 = 34.97$
$r_{18} = 53.5620$
  $d_{18} = 0.325$
$r_{19} = 55.3178$
  $d_{19} = 8.150$   $n_{10} = 1.49845$  $\nu_{10} = 81.61$
$r_{20} = -24.8127$
  $d_{20} = 2.070$
$r_{21} = 44.5534$
  $d_{21} = 5.231$   $n_{11} = 1.48915$  $\nu_{11} = 70.20$
$r_{22} = -144.7822$
  $d_{22} = 1.860$
$r_{23} = \infty$
  $d_{23} = 18.500$  $n_{12} = 1.51825$  $\nu_{12} = 64.15$
$r_{24} = \infty$
  $d_{24} = 1.000$
$r_{25} = \infty$
  $d_{25} = 50.500$  $n_{13} = 1.69979$  $\nu_{13} = 55.52$
$r_{26} = \infty$ $|f_1/f_3| = 0.369$,  $|f/f_2| = 0.513$,  $|f_1 f_{1-1}| = 0.110$
$|f_{1-2}/f_1| = 0.851$,  $|f_3/f_{3-1}| = 0.269$
$|f_3/f_{3-2}| = 0.827$,  $|f_P/f_3| = 0.536$
$|e_{12}/f| = 1.041$,  $|e_{23}/f| = 4.457$,  $f_B/f = 2.336$
$E_X/f = 0.015$

| Embodiment 2 | | | |
|---|---|---|---|
| $f = 20.267$, | F number = 3.90, | $2\omega = 58.46°$ | |
| $r_1 = 184.0707$ | | | |
| | $d_1 = 4.500$ | $n_1 = 1.64419$ | $\nu_1 = 34.48$ |
| $r_2 = -377.2177$ | | | |
| | $d_2 = 3.629$ | | |
| $r_3 = 111.4484$ | | | |
| | $d_3 = 3.000$ | $n_2 = 1.81264$ | $\nu_2 = 25.43$ |
| $r_4 = 20.7973$ | | | |
| | $d_4 = 5.558$ | | |
| $r_5 = -129.4211$ | | | |
| | $d_5 = 2.500$ | $n_3 = 1.71615$ | $\nu_3 = 53.84$ |
| $r_6 = 35.1818$ | | | |
| | $d_6 = 17.551$ | | |
| $r_7 = 93.4131$ | | | |
| | $d_7 = 6.000$ | $n_4 = 1.74435$ | $\nu_4 = 52.68$ |
| $r_8 = -44.8401$ | | | |
| | $d_8 = 46.407$ | | |
| $r_9 = \infty$ (stop) | | | |
| | $d_9 = 3.000$ | | |
| $r_{10} = -141.5465$ | | | |
| | $d_{10} = 4.500$ | $n_5 = 1.73234$ | $\nu_5 = 54.68$ |
| $r_{11} = 23.7493$ | | | |
| | $d_{11} = 2.500$ | | |
| $r_{12} = 28.4971$ | | | |
| | $d_{12} = 12.417$ | $n_6 = 1.81264$ | $\nu_6 = 25.43$ |
| $r_{13} = 207.1116$ | | | |
| | $d_{13} = 0.100$ | | |
| $r_{14} = 352.3790$ | | | |
| | $d_{14} = 4.100$ | $n_7 = 1.48915$ | $\nu_7 = 70.20$ |
| $r_{15} = -49.0109$ | | | |
| | $d_{15} = 13.992$ | | |
| $r_{16} = 336.8573$ | | | |
| | $d_{16} = 6.101$ | $n_8 = 1.48915$ | $\nu_8 = 70.20$ |
| $r_{17} = -19.4027$ | | | |
| | $d_{17} = 2.000$ | $n_9 = 1.80642$ | $\nu_9 = 34.97$ |
| $r_{18} = 66.8676$ | | | |
| | $d_{18} = 0.150$ | | |
| $r_{19} = 68.9921$ | | | |
| | $d_{19} = 6.213$ | $n_{10} = 1.49845$ | $\nu_{10} = 81.61$ |
| $r_{20} = -24.3434$ | | | |
| | $d_{20} = 1.000$ | | |
| $r_{21} = 44.4620$ | | | |
| | $d_{21} = 4.589$ | $n_{11} = 1.48915$ | $\nu_{11} = 70.20$ |
| $r_{22} = -200.7663$ | | | |
| | $d_{22} = 1.860$ | | |
| $r_{23} = \infty$ | | | |
| | $d_{23} = 19.000$ | $n_{12} = 1.51825$ | $\nu_{12} = 64.15$ |
| $r_{24} = \infty$ | | | |
| | $d_{24} = 6.380$ | | |
| $r_{25} = \infty$ | | | |
| | $d_{25} = 50.000$ | $n_{13} = 1.69979$ | $\nu_{13} = 55.52$ |
| $r_{26} = \infty$ | | | |
| $|f_1/f_3| = 0.407$, $|f/f_2| = 0.489$, $|f_1/f_{1-1}| = 0.096$ | | | |
| $|f_{1-2}/f_1| = 0.864$, $|f_3/f_{3-1}| = 0.171$ | | | |
| $|f_3/f_{3-2}| = 0.789$, $|f_P/f_3| = 0.558$ | | | |
| $|e_{12}/f| = 1.106$, $|e_{23}/f| = 4.397$, $f_B/f = 2.523$ | | | |
| $E_x/f = 0.031$ | | | |

| Embodiment 3 | | | |
|---|---|---|---|
| $f = 20.080$, | F number = 3.90, | $2\omega = 58.87°$ | |
| $r_1 = 242.8886$ | | | |
| | $d_1 = 4.557$ | $n_1 = 1.64419$ | $\nu_1 = 34.48$ |
| $r_2 = -285.1603$ | | | |
| | $d_2 = 3.544$ | | |
| $r_3 = 139.4667$ | | | |
| | $d_3 = 3.000$ | $n_2 = 1.81264$ | $\nu_2 = 25.43$ |
| $r_4 = 20.7402$ | | | |
| | $d_4 = 6.082$ | | |
| $r_5 = -155.9618$ | | | |
| | $d_5 = 2.500$ | $n_3 = 1.71615$ | $\nu_3 = 53.84$ |
| $r_6 = 36.3231$ | | | |
| | $d_6 = 17.551$ | | |
| $r_7 = 96.9952$ | | | |
| | $d_7 = 6.000$ | $n_4 = 1.74435$ | $\nu_4 = 52.68$ |
| $r_8 = -43.2623$ | | | |
| | $d_8 = 46.407$ | | |
| $r_9 = \infty$ (stop) | | | |
| | $d_9 = 3.000$ | | |
| $r_{10} = -132.7582$ | | | |
| | $d_{10} = 4.500$ | $n_5 = 1.73234$ | $\nu_5 = 54.68$ |
| $r_{11} = 23.2931$ | | | |
| | $d_{11} = 2.500$ | | |
| $r_{12} = 27.6303$ | | | |
| | $d_{12} = 13.594$ | $n_6 = 1.81264$ | $\nu_6 = 25.43$ |
| $r_{13} = 160.5212$ | | | |
| | $d_{13} = 0.100$ | | |
| $r_{14} = 326.1577$ | | | |
| | $d_{14} = 4.687$ | $n_7 = 1.48915$ | $\nu_7 = 70.20$ |
| $r_{15} = -51.5120$ | | | |
| | $d_{15} = 13.992$ | | |
| $r_{16} = 128.2926$ | | | |
| | $d_{16} = 6.542$ | $n_8 = 1.48915$ | $\nu_8 = 70.20$ |
| $r_{17} = -18.6776$ | | | |
| | $d_{17} = 2.000$ | $n_9 = 1.80642$ | $\nu_9 = 34.97$ |
| $r_{18} = 89.2487$ | | | |
| | $d_{18} = 0.150$ | | |
| $r_{19} = 85.5876$ | | | |
| | $d_{19} = 5.820$ | $n_{10} = 1.49845$ | $\nu_{10} = 81.61$ |
| $r_{20} = -25.1540$ | | | |
| | $d_{20} = 1.000$ | | |
| $r_{21} = 61.5066$ | | | |
| | $d_{21} = 4.256$ | $n_{11} = 1.48915$ | $\nu_{11} = 70.20$ |
| $r_{22} = -112.1569$ | | | |
| | $d_{22} = 1.860$ | | |
| $r_{23} = \infty$ | | | |
| | $d_{23} = 19.000$ | $n_{12} = 1.51825$ | $\nu_{12} = 64.15$ |
| $r_{24} = \infty$ | | | |
| | $d_{24} = 6.380$ | | |
| $r_{25} = \infty$ | | | |
| | $d_{25} = 50.000$ | $n_{13} = 1.69979$ | $\nu_{13} = 55.52$ |
| $r_{26} = \infty$ | | | |
| $|f_1/f_3| = 0.400$, $|f/f_2| = 0.490$, $|f_1/f_{1-1}| = 0.089$ | | | |
| $|f_{1-2}/f_1| = 0.875$, $|f_3/f_{3-1}| = 0.102$ | | | |
| $|f_3/f_{3-2}| = 0.809$, $|f_P/f_3| = 0.605$ | | | |
| $|e_{12}/f| = 1.147$, $|e_{23}/f| = 4.463$, $f_B/f = 2.547$ | | | |
| $E_x/f = 0.038$ | | | |

| Embodiment 4 | | | |
|---|---|---|---|
| $f = 20.084$, | F number = 3.90, | $2\omega = 58.86°$ | |
| $r_1 = 163.9541$ | | | |
| | $d_1 = 4.500$ | $n_1 = 1.60891$ | $\nu_1 = 43.73$ |
| $r_2 = -355.8608$ | | | |
| | $d_2 = 1.451$ | | |
| $r_3 = 117.2582$ | | | |
| | $d_3 = 3.000$ | $n_2 = 1.81264$ | $\nu_2 = 25.43$ |
| $r_4 = 20.5687$ | | | |
| | $d_4 = 5.821$ | | |
| $r_5 = -132.7176$ | | | |
| | $d_5 = 2.500$ | $n_3 = 1.69979$ | $\nu_3 = 55.52$ |
| $r_6 = 35.7624$ | | | |
| | $d_6 = 17.551$ | | |
| $r_7 = 94.4328$ | | | |
| | $d_7 = 5.989$ | $n_4 = 1.75844$ | $\nu_4 = 52.33$ |
| $r_8 = -44.1953$ | | | |
| | $d_8 = 46.407$ | | |
| $r_9 = \infty$ (stop) | | | |
| | $d_9 = 3.000$ | | |
| $r_{10} = -92.9723$ | | | |
| | $d_{10} = 4.500$ | $n_5 = 1.73234$ | $\nu_5 = 54.68$ |
| $r_{11} = 24.3949$ | | | |
| | $d_{11} = 2.500$ | | |

-continued

Embodiment 4
f = 20.084, F number = 3.90, 2ω = 58.86°

| | | | |
|---|---|---|---|
| $r_{12}$ = 28.8043 | | | |
| | $d_{12}$ = 15.663 | $n_6$ = 1.81264 | $\nu_6$ = 25.43 |
| $r_{13}$ = 234.0087 | | | |
| | $d_{13}$ = 0.100 | | |
| $r_{14}$ = 904.5932 | | | |
| | $d_{14}$ = 4.063 | $n_7$ = 1.48915 | $\nu_7$ = 70.20 |
| $r_{15}$ = −54.8414 | | | |
| | $d_{15}$ = 13.992 | | |
| $r_{16}$ = 83.9289 | | | |
| | $d_{16}$ = 7.405 | $n_8$ = 1.48915 | $\nu_8$ = 70.20 |
| $r_{17}$ = −20.8595 | | | |
| | $d_{17}$ = 2.000 | $n_9$ = 1.80642 | $\nu_9$ = 34.97 |
| $r_{18}$ = 69.5276 | | | |
| | $d_{18}$ = 0.150 | | |
| $r_{19}$ = 68.3979 | | | |
| | $d_{19}$ = 5.544 | $n_{10}$ = 1.49845 | $\nu_{10}$ = 81.61 |
| $r_{20}$ = −28.7633 | | | |
| | $d_{20}$ = 1.000 | | |
| $r_{21}$ = 63.1563 | | | |
| | $d_{21}$ = 4.656 | $n_{11}$ = 1.48915 | $\nu_{11}$ = 70.20 |
| $r_{22}$ = −80.5138 | | | |
| | $d_{22}$ = 1.860 | | |
| $r_{23}$ = ∞ | | | |
| | $d_{23}$ = 19.000 | $n_{12}$ = 1.51825 | $\nu_{12}$ = 64.15 |
| $r_{24}$ = ∞ | | | |
| | $d_{24}$ = 6.380 | | |
| $r_{25}$ = ∞ | | | |
| | $d_{25}$ = 50.000 | $n_{13}$ = 1.69979 | $\nu_{13}$ = 55.52 |
| $r_{26}$ = ∞ | | | |

$|f_1/f_3|$ = 0.419, $|f/f_2|$ = 0.497, $|f_1/f_{1-1}|$ = 0.100
$|f_{1-2}/f_1|$ = 0.870, $|f_3/f_{3-1}|$ = 0.014
$|f_3/f_{3-2}|$ = 0.823, $|f_P/f_3|$ = 0.620
$e_{12}/f$ = 1.137, $e_{23}/f$ = 4.485, $f_B/f$ = 2.547
$E_x/f$ = 0.020

Embodiment 5
f = 12.047, F number = 3.90, 2ω = 86.10°

| | | | |
|---|---|---|---|
| $r_1$ = 120.6202 | | | |
| | $d_1$ = 7.705 | $n_1$ = 1.60548 | $\nu_1$ = 60.68 |
| $r_2$ = 363.6060 | | | |
| | $d_2$ = 0.724 | | |
| $r_3$ = 52.2624 | | | |
| | $d_3$ = 3.000 | $n_2$ = 1.79013 | $\nu_2$ = 44.18 |
| $r_4$ = 31.4104 | | | |
| | $d_4$ = 12.966 | | |
| $r_5$ = 83.4217 | | | |
| | $d_5$ = 2.500 | $n_3$ = 1.83945 | $\nu_3$ = 42.72 |
| $r_6$ = 32.7194 | | | |
| | $d_6$ = 14.202 | | |
| $r_7$ = 382.5602 | | | |
| | $d_7$ = 3.000 | $n_4$ = 1.59143 | $\nu_4$ = 61.18 |
| $r_8$ = 39.4514 | | | |
| | $d_8$ = 12.466 | | |
| $r_9$ = −57.8220 | | | |
| | $d_9$ = 5.192 | $n_5$ = 1.67158 | $\nu_5$ = 33.04 |
| $r_{10}$ = −38.5128 | | | |
| | $d_{10}$ = 19.941 | | |
| $r_{11}$ = ∞ | | | |
| | $d_{11}$ = 18.616 | $n_6$ = 1.69979 | $\nu_6$ = 55.52 |
| $r_{12}$ = 61.0055 | | | |
| | $d_{12}$ = 22.176 | | |
| $r_{13}$ = ∞ (stop) | | | |
| | $d_{13}$ = 3.000 | | |
| $r_{14}$ = 66.7736 | | | |
| | $d_{14}$ = 4.500 | $n_7$ = 1.81264 | $\nu_7$ = 25.43 |
| $r_{15}$ = −104.3420 | | | |
| | $d_{15}$ = 2.500 | | |
| $r_{16}$ = −43.6843 | | | |
| | $d_{16}$ = 13.094 | $n_8$ = 1.60548 | $\nu_8$ = 60.68 |

-continued

Embodiment 5
f = 12.047, F number = 3.90, 2ω = 86.10°

| | | | |
|---|---|---|---|
| $r_{17}$ = 60.6588 | | | |
| | $d_{17}$ = 0.0 | | |
| $r_{18}$ = 56.8576 | | | |
| | $d_{18}$ = 3.587 | $n_9$ = 1.48915 | $\nu_9$ = 70.20 |
| $r_{19}$ = −45.1710 | | | |
| | $d_{19}$ = 14.933 | | |
| $r_{20}$ = 82.8383 | | | |
| | $d_{20}$ = 6.866 | $n_{10}$ = 1.48915 | $\nu_{10}$ = 70.20 |
| $r_{21}$ = −29.1204 | | | |
| | $d_{21}$ = 2.000 | $n_{11}$ = 1.80642 | $\nu_{11}$ = 34.97 |
| $r_{22}$ = 39.5527 | | | |
| | $d_{22}$ = 0.147 | | |
| $r_{23}$ = 38.8645 | | | |
| | $d_{23}$ = 5.097 | $n_{12}$ = 1.49845 | $\nu_{12}$ = 81.61 |
| $r_{24}$ = −37.3627 | | | |
| | $d_{24}$ = 0.150 | | |
| $r_{25}$ = 56.3748 | | | |
| | $d_{25}$ = 3.459 | $n_{13}$ = 1.48915 | $\nu_{13}$ = 70.20 |
| $r_{26}$ = −78.1421 | | | |
| | $d_{26}$ = 1.860 | | |
| $r_{27}$ = ∞ | | | |
| | $d_{27}$ = 19.000 | $n_{14}$ = 1.51825 | $\nu_{14}$ = 64.15 |
| $r_{28}$ = ∞ | | | |
| | $d_{28}$ = 6.380 | | |
| $r_{29}$ = ∞ | | | |
| | $d_{29}$ = 50.000 | $n_{15}$ = 1.71615 | $\nu_{15}$ = 53.84 |
| $r_{30}$ = ∞ | | | |

$|f_1/f_3|$ = 0.669, $|f/f_2|$ = 0.078, $|f_1/f_{1-1}|$ = 0.086
$|f_{1-2}/f_1|$ = 0.842, $|f_{3/f3-1}|$ = 0.343
$|f_3/f_{3-2}|$ = 0.633, $|f_P/f_3|$ = 0.672
$e_{12}/f$ = 2.464, $e_{23}/f$ = 6.312, $f_B/f$ = 4.219
$E_x/f$ = 0.039

Embodiment 6
f = 12.029, F number = 3.90, 2ω = 86.21°

| | | | |
|---|---|---|---|
| $r_1$ = 101.5704 | | | |
| | $d_1$ = 9.973 | $n_1$ = 1.59143 | $\nu_1$ = 61.18 |
| $r_2$ = 277.3720 | | | |
| | $d_2$ = 2.571 | | |
| $r_3$ = 52.7789 | | | |
| | $d_3$ = 3.000 | $n_2$ = 1.77620 | $\nu_2$ = 49.66 |
| $r_4$ = 31.2510 | | | |
| | $d_4$ = 12.070 | | |
| $r_5$ = 102.3965 | | | |
| | $d_5$ = 2.500 | $n_3$ = 1.77620 | $\nu_3$ = 49.66 |
| $r_6$ = 33.9403 | | | |
| | $d_6$ = 13.502 | | |
| $r_7$ = −3871.0510 | | | |
| | $d_7$ = 3.000 | $n_4$ = 1.59143 | $\nu_4$ = 61.18 |
| $r_8$ = 42.2567 | | | |
| | $d_8$ = 13.610 | | |
| $r_9$ = −42.0548 | | | |
| | $d_9$ = 3.640 | $n_5$ = 1.67158 | $\nu_5$ = 33.04 |
| $r_{10}$ = −33.9941 | | | |
| | $d_{10}$ = 29.595 | | |
| $r_{11}$ = 148.3722 | | | |
| | $d_{11}$ = 8.500 | $n_6$ = 1.69979 | $\nu_6$ = 55.52 |
| $r_{12}$ = 78.1920 | | | |
| | $d_{12}$ = 28.006 | | |
| $r_{13}$ = ∞ (stop) | | | |
| | $d_{13}$ = 6.500 | | |
| $r_{14}$ = 80.3751 | | | |
| | $d_{14}$ = 5.500 | $n_7$ = 1.81264 | $\nu_7$ = 25.43 |
| $r_{15}$ = 64.8302 | | | |
| | $d_{15}$ = 2.722 | | |
| $r_{16}$ = −27.9019 | | | |
| | $d_{16}$ = 4.950 | $n_8$ = 1.60548 | $\nu_8$ = 60.68 |
| $r_{17}$ = 63.7468 | | | |
| | $d_{17}$ = 0.150 | | |

-continued

Embodiment 6
f = 12.029, F number = 3.90, 2ω = 86.21°

| | | |
|---|---|---|
| $r_{18}$ = 101.2640 | | |
| $d_{18}$ = 4.662 | $n_9$ = 1.48915 | $v_9$ = 70.20 |
| $r_{19}$ = −29.1035 | | |
| $d_{19}$ = 9.582 | | |
| $r_{20}$ = 879.3216 | | |
| $d_{20}$ = 7.155 | $n_{10}$ = 1.48915 | $v_{10}$ = 70.20 |
| $r_{21}$ = −19.9873 | | |
| $d_{21}$ = 0.406 | | |
| $r_{22}$ = −20.7867 | | |
| $d_{22}$ = 2.000 | $n_{11}$ = 1.80642 | $v_{11}$ = 34.97 |
| $r_{23}$ = 45.4694 | | |
| $d_{23}$ = 4.500 | $n_{12}$ = 1.48915 | $v_{12}$ = 70.20 |
| $r_{24}$ = −34.8495 | | |
| $d_{24}$ = 0.150 | | |
| $r_{25}$ = 69.8589 | | |
| $d_{25}$ = 3.516 | $n_{13}$ = 1.49845 | $v_{13}$ = 81.61 |
| $r_{26}$ = −38.6182 | | |
| $d_{26}$ = 1.860 | | |
| $r_{27}$ = ∞ | | |
| $d_{27}$ = 19.000 | $n_{14}$ = 1.51825 | $v_{14}$ = 64.15 |
| $r_{28}$ = ∞ | | |
| $d_{28}$ = 6.380 | | |
| $r_{29}$ = ∞ | | |
| $d_{29}$ = 50.000 | $n_{15}$ = 1.71615 | $v_{15}$ = 53.84 |
| $r_{30}$ = ∞ | | |

$|f_1/f_3|$ = 0.621, $|f/f_2|$ = 0.054, $|f_1/f_{1-1}|$ = 0.098
$|f_{1-2}/f_1|$ = 0.811, $|f_3/f_{3-1}|$ = 0.481
$|f_3/f_{3-2}|$ = 0.664, $|f_P/f_3|$ = 1.204
$|e_{12}/f|$ = 2.565, $|e_{23}/f|$ = 7.244, $f_B/f$ = 4.231
$E_x/f$ = 0.052

Each of the first through fourth embodiments has a composition illustrated in FIG. 1, wherein the lens system consists, in order from the object side, of a first lens unit G1 which has a negative power as a whole, a second lens unit G2 which has a positive power and a third lens unit G3 which has a positive power as a whole: the first lens unit G1 being composed, in order from the object side, of a 1-1 subunit G11 which is composed of a positive lens component and has a positive power, and a 1-2 subunit G12 which is composed of two negative lens components and has a negative power, the second lens unit G2 being composed of a single positive lens component, and the third lens unit G3 being composed, in order from the object side, of a stop S, a 3-1 subunit which is composed of a negative lens component L31 and two positive lens components L32, and a 3-2 subunit G32 which is composed of a negative cemented lens component L33 consisting of a positive lens element and a negative lens element, and a positive lens component L34 consisting of two positive lens elements.

Each of these first through fourth embodiments corrects negative distortion remarkably produced by the first lens unit G1 by distributing a positive power to the 1-1 subunit G11 of the first lens unit G1. The second lens unit G2 functions to lower paraxial rays and correct negative distortion remaining in the first lens unit G1. Further, the third lens unit G3 is composed of the 3-1 subunit which is composed of the negative lens component L31 and the positive lens component L32 so as to have a negative-positive composition, and the 3-2 subunit which is composed of the negative lens component L33 and the positive lens component L34 so as to have a negative-positive composition, and adopt a power distribution wherein a positive power stronger than that of the 3-1 subunit G31 is distributed to the 3-2 subunit G32, thereby making it possible to obtain a long back focal length.

Further, a lens component LP which is composed of the two positive lens elements disposed on the image side in the third lens unit G3, or the lens component L4 serves for locating an exit pupil at a nearly infinite or adequately long distance.

In these embodiments, plane parallel glass plates disposed on the image side in the lens system (image side of the third lens unit G3) represent a low pass filter, an infrared cut filter, a color separating prism or an optical path splitting prism, a trimming filter and so on.

Figure 2:
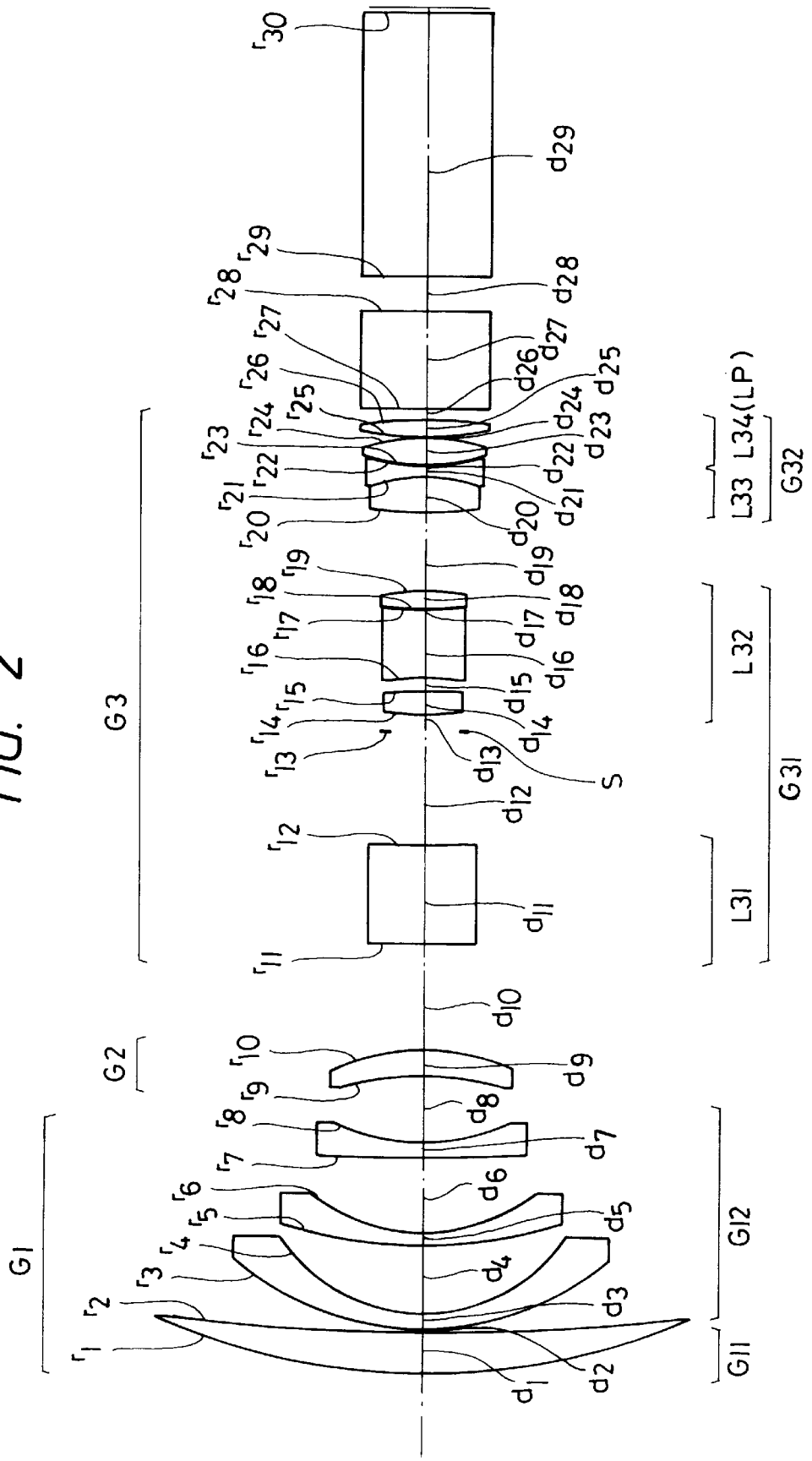
FIG. 2 shows a sectional view illustrating a composition of a fifth embodiment of the lens system according to the present invention.

The fifth embodiment has a composition illustrated in FIG. 2 and a photographing field angle which is wider than that of any one of the first through fourth embodiments.

Differently from the first embodiment, the lens system preferred as the fifth embodiment uses a 1-2 subunit G12 of a first lens unit G1 which consists of three negative meniscus lens components having a concave surface on the image side, a second lens unit G2 which consists of a positive meniscus lens component having a concave surface on the object side, and a 3-1 subunit G31 of a third lens unit G3 which consists, in order from the object side, of a negative lens component L31 having a weak power, a stop S, and a positive lens component L32 consisting of a positive lens element, a negative lens element and a positive lens element.

The sixth embodiment has a composition illustrated in FIG. 3 and has a wide field angle like the fifth embodiment.

Differently from the fifth embodiment, the lens system preferred as the sixth embodiment uses a 3-2 subunit of a third lens unit G3 which consists, in order from the object side, of a positive lens component L33 and a negative cemented lens component L34 consisting of a negative lens element and a positive lens element, and a positive lens component L35. Owing to this composition, the sixth embodiment suppresses offaxial aberrations such as coma and astigmatism more effectively than the other embodiments.

The fifth and sixth embodiments are lens systems which have extremely wide photographing field angles of approximately 90°, back focal lengths long enough to dispose optical members such as low pass filters, infrared cut filters and color separating prisms or optical path splitting prisms, and optical performance favorably enough to use image pickup devices on which small pixels are arranged.

In each of the first through fourth embodiments and the fifth embodiment, both the 3-1 subunit G31 and the 3-2 subunit G32 of the third lens unit G3 have negative-positive retrofocus type power distributions, or are composed of the first negative lens component L31 and the second positive lens component L32, and the third negative lens component L33 and the fourth positive lens component L34 respectively, thereby prolonging a back focal length $f_B$. Further, the positive lens component LP is disposed on the image side in the third lens unit G3, thereby locating the exit pupil at a nearly infinite or adequately long distance.

In the sixth embodiment, the 3-1 subunit G31 of the third lens unit G3 is composed of the first negative lens component L31 and the second positive lens component L32, or has a negative-positive power distribution, whereas the 3-2 subunit G32 is composed of the third positive lens component L33 and the fourth negative lens component L34 and the fifth positive lens component L35, or has a positive-negative-positive triplet type power distribution, thereby correcting offaxial aberrations such as coma and astigmatism favorably as compared with the other embodiments. Also in the third lens unit of the sixth embodiment, a lens component LP is disposed on the image side in the third lens unit for locating an exit pupil at a nearly infinite distance.

What is claimed is:

1. A wide-angle lens system which has a long back focal length, comprising, in order from an object side:

a first lens unit which has a negative power as a whole;

a second lens unit which has a positive power as a whole; and a third lens unit which has a positive power as a whole, wherein said first lens unit comprises, in order from the object side, a 1-1 subunit consisting of a positive lens component or positive lens components and having a positive power, a 1-2 subunit consisting of a negative lens component or negative lens components and having a negative power, and wherein said third lens unit comprises, in order from the object side, a 3-1 subunit of said third lens unit comprising, in order from the object side, a first lens component consisting of a negative lens element or negative lens elements and having a negative power, a second lens component which has a positive power, a 3-2 subunit comprising, in order from the object side, a third lens component which has a negative power and a fourth lens component which has a positive power, wherein an aperture stop is disposed between said second lens unit and said third lens unit or in said third lens unit, and wherein said lens system satisfies the following condition (11):

(11) $50° < 2\omega < 95°$ wherein the reference symbol $2\omega$ denotes a field angle of the lens system.

2. A wide-angle lens system which has a long back focal length, comprising, in order from an object side:

a first lens unit which has a negative power as a whole;

a second lens unit which has a positive power as a whole; and a third lens unit which has a positive power as a whole, wherein said first lens unit comprises, in order from the object side, a 1-1 subunit consisting of a positive lens component or positive lens components and has a positive power, a 1-2 subunit consisting of a negative lens component or negative lens components and has a negative power, wherein said third lens unit comprises, in order from the object side, a 3-1 subunit comprising, in order from the object side, a first lens component consisting of a negative lens element or negative lens elements and having a negative power, and a second lens component having a positive power, a 3-2 subunit comprising, in order from the object side, a third lens component which has a positive power, a fourth lens component which has a negative power, a fifth lens component which has a positive power, wherein an aperture stop is disposed in said third lens unit, and wherein said lens system satisfies the following condition (11):

(11) $50° < 2\omega < 95°$ wherein the reference symbol $2\omega$ denotes a field angle of the lens system.

3. A wide-angle lens system which has a long back focal length, comprising, in order from an object side:

a first lens unit which has a negative power;

a second lens unit which has a positive power; and a third lens unit which has a positive power, wherein said first lens unit comprises, in order from the object side, a 1-1 subunit which consists of a positive lens component or positive lens components, a 1-2 subunit which consists of a negative lens component or negative lens components, wherein said third lens unit comprises, in order from the object side, a 3-1 subunit which comprises at least one negative lens component and has a negative power, a 3-2 subunit which comprises at least one negative lens component and has a positive power, wherein an aperture stop is disposed between said second lens unit and said third lens unit or disposed in said third lens unit, and wherein said lens system satisfies the following conditions (1) through (6), and (11), (1) $0.2 < |f_1/f_3| < 0.8$ (2) $0.01 < |f/f_2| < 0.7$ (3) $0.01 < |f_1/f_{1-1}| < 0.5$ (4) $0.7 < |f_{1-2}/f_1| < 1.0$ (5) $|f_3/f_{3-1}| < 0.6$ (6) $0.5 < |f_3/f_{3-2}| < 0.95$

(11) $50° < 2\omega < 95°$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$, denote focal lengths of the 1-1 subunit, the 1-2 subunit, the 3-1 subunit and the 3-2 subunit respectively and the reference symbol $2\omega$ denotes a field angle of the lens system.

4. A wide-angle lens system which has a long back focal length, comprising, in order from an object side:

a first lens unit which has a negative power;

a second lens unit which has a positive power; and a third lens unit which has a positive power, wherein said first lens unit comprises, in order from the object side, a 1-1 subunit which consists of a positive lens component or positive lens components and has a positive power, and a 1-2 subunit which consists of a negative lens component or negative lens components and has a negative power, wherein said third lens unit comprises, in order from the object side, a 3-1 subunit, and a 3-2 subunit having a positive power, wherein the 3-1 subunit comprises, in order from the object side, a first lens component consisting of a negative lens element or negative lens elements and has a negative power, a second lens component which has a positive power, and wherein the 3-2 subunit comprises, in order from the object side, a third lens component which has a negative power, and a fourth lens component which has a positive power and wherein said lens system satisfies the following condition (9):

(9) $3 < |e_{23}/f| < 10$ wherein the reference symbol $e_{23}$ represents a distance between principal points of the second lens unit and the third lens unit, and the reference symbol f designates a focal length of the lens system as a whole.

5. A wide-angle lens system which has a long back focal length, comprising, in order from an object side:

a first lens unit which has a negative power;

a second lens unit which has a positive power; and a third lens unit which has a positive power, wherein said first lens unit comprises a 1-1 subunit which consists of a positive lens component or positive lens components, and has a positive power, and 1-2 subunit which consists of a negative lens component or negative lens components and has a negative power, wherein said third lens unit comprises, in order from the object side, a 3-1 subunit which comprises at least one negative lens component, and a 3-2 subunit which comprises at least one negative lens component and has a positive power, wherein the 3-1 subunit has a negative power and comprises, a first lens component which consists of a negative lens element or negative lens elements and has a negative power, a second lens component which has a positive power, and wherein the 3-2 subunit has a positive power and comprises, a third lens component which has a positive power, a fourth lens component which has a negative power, and a fifth lens component which has a positive power, and wherein said lens system satisfies the following condition (9):

(9) $3 < |e_{23}/f| < 10$ wherein the reference symbol $e_{23}$ represents a distance between principal points of the second lens unit and the third lens unit, and the reference symbol f designates a focal length of the lens system as a whole.

6. A wide-angle lens system which has a long back focal length, comprising, in order from an object side:

a first lens unit which has a negative power;

a second lens unit which has a positive power; and a third lens unit which has a positive power, wherein said first lens unit comprises, in order from the object side, a 1-1 subunit which consists of a positive lens component or positive lens components, a 1-2 subunit which consists of a negative lens component or negative lens components, wherein said third lens unit comprises, in order from the object side, a 3-1 subunit which comprises at least one negative lens component, and a 3-2 subunit which comprises at least one negative lens component and has a positive power, and wherein said lens system satisfies the following conditions (1) through (6) and (9):

(1) $0.2 < |f_1/f_3| < 0.8$
(2) $0.01 < |f/f_2| < 0.7$
(3) $0.01 < |f_1/f_{1-1}| < 0.5$
(4) $0.7 < |f_{1-2}/f_{1-1}| < 1.0$
(5) $|f_3/f_{3-1}| < 0.6$
(6) $0.5 < |f_3/f_{3-2}| < 0.95$
(9) $3 < |e_{23}/f| < 10$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$, denote focal lengths of the 1-1 subunit, the 1-2 subunit, the 3-1 subunit and the 3-2 subunit respectively, the reference symbol $e_{23}$ represents a distance between principal points of the second lens unit and the third lens unit, and the reference symbol f designates a focal length of the lens system as a whole.

7. A wide-angle lens system which has a long back focal length, comprising, in order from an object side:

a first lens unit which has a negative power;

a second lens unit which has a positive power; and a third lens unit which has a positive power, wherein said first lens unit comprises, in order from the object side, a 1-1 subunit which consists of a positive lens component or positive lens components, a 1-2 subunit which consists of a negative lens component or negative lens components, wherein said third lens unit comprises, in order from the object side, a 3-1 subunit which comprises at least one negative lens element, a 3-2 subunit which comprises at least a negative lens element, and has a positive power, wherein the 3-1 subunit comprises, in order from the object side, a first lens component which consists of a negative lens element or negative lens elements, a second lens component which has a positive power, and wherein the 3-2 subunit comprises, in order from the object side, a third lens component which has a negative power, and a fourth lens component which has a positive power, and wherein said lens system satisfies the following condition (12):

(12) $|f/E_X| < 0.10$ wherein the reference symbol f designates the focal length of the lens system and the reference symbol $E_X$ represents a length from an image side surface of the lens system to an exit pupil of the lens system.

8. A wide-angle lens system according to claim 1, 4 or 7 satisfying the following conditions (1) through (6):

(1) $0.2 < |f_1/f_3| < 0.8$
(2) $0.01 < |f/f_2| < 0.7$
(3) $0.01 < |f_1/f_{1-1}| < 0.5$
(4) $0.7 < |f_{1-2}/f_1| < 1.0$
(5) $|f_3/f_{3-1}| < 0.6$
(6) $0.5 < |f_3/f_{3-2}| < 0.95$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$ denote focal lengths of the 1-1 subunit, the 1-2 subunit, the 3-1 subunit and the 3-2 subunit respectively.

9. A wide-angle lens system according to claim 8, wherein a lens component which has a positive power is disposed on the image side of the 3-2 subunit.

10. A wide-angle lens system according to claim 8, satisfying the following condition (8):

(8) $0.5<|e_{12}/f|<3.5$ wherein the reference symbols $e_{12}$ represents a distance between principal points of the first lens unit and the second lens unit and the reference symbol f represents a focal length of the lens system as a whole.

11. A wide-angle lens system according to claim 8, satisfying the following condition (10):

(10) $2.0<|f_B/f|<6.0$ wherein the reference symbol f represents a focal length of the lens system as a whole and wherein the reference symbol $f_B$ designates a back focal length of the lens system.

12. An image pickup system equipped with a lens system as claimed in claim 8.

13. A wide-angle lens system according to claim 8, further comprising an exit pupil location adjuster which consists of a positive lens element or positive lens elements and is disposed on an image side of the 3-2 subunit and which satisfies the following conditions (1-1), (2-1), (3-1), (4-1), (5-2), (6-1) and (7-1):

(1-1) $0.3<|f_1/f_3|<0.7$
(2-1) $0.03<|f/f_2|<0.6$
(3-1) $0.05<|f_1/f_{1-1}|<0.2$
(4-1) $0.8<|f_{1-2}/f_1|<0.9$
(5-2) $|f_3/f_{3-1}|<0.4$
(6-1) $0.6<|f_3/f_{3-2}|<0.85$
(7-1) $0.5<|f_P/f_3|<1.25$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$ denote focal lengths of the 1-1 subunit, the 1-2 subunit, the 3-1 subunit and the 3-2 subunit respectively, and the reference symbol $f_P$ represents focal length of the exit pupil location adjuster.

14. A wide-angle lens system which has a long back focal length, comprising, in order from an object side:

a first lens unit which has a negative power;

a second lens unit which has a positive power; and a third lens unit which has a positive power;

wherein said first lens unit comprises, in order from the object side, a 1-1 subunit which consists of a positive lens component or positive lens components, a 1-2 subunit which consists of a negative lens component or negative lens components, wherein said third lens unit comprises, in order from the object side, a 3-1 subunit which comprises at least one negative lens component, and a 3-2 subunit which comprises at least one negative lens component and has a positive power, wherein the 3-1 subunit comprises, in order from the object side, a first lens component which consists of a negative lens element or negative lens elements, and a second lens component which has a positive power, and wherein the 3-2 subunit comprises, in order from the object side, a third lens component which has a positive power, a fourth lens component which has a negative power, and a fifth lens component which has a positive power, and wherein said lens system satisfies the following condition (12):

(12) $|f/E_X|<0.10$ wherein the reference symbol f designates a focal length of the lens system as a whole, and the reference symbol $E_X$ represents a length from an image side surface of the lens system to an exit pupil of the lens system.

15. A wide-angle lens system according to claim 2, 5 or 14 satisfying the following conditions (1) through (6):

(1) $0.2<|f_1/f_3|<0.8$
(2) $0.01<|f/f_2|<0.7$
(3) $0.01<|f_1/f_{1-1}|<0.5$
(4) $0.7<|f_{1-2}/f_1|<1.0$
(5) $|f_3/f_{3-1}|<0.6$
(6) $0.5<|f_3/f_{3-2}|<0.95$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$ denote focal lengths of the 1-1 subunit, the 1-2 subunit, the 3-1 subunit and the 3-2 subunit respectively.

16. A wide-angle lens system according to claim 15, wherein a lens component which has a positive power is disposed on the image side of the 3-2 subunit.

17. A wide-angle lens system according to claim 15, satisfying the following condition 8:

(8) $0.5<|e_{12}/f|<3.5$ wherein the reference symbols $e_{12}$ represents a distance between principal points of the first lens unit and the second lens unit and the reference symbol f represents a focal length of the lens system as a whole.

18. A wide-angle lens system according to claim 15, satisfying the following condition (10):

(10) $2.0<|f_B/f|<6.0$ wherein the reference symbol f represents a focal length of the lens system as a whole and wherein the reference symbol $f_B$ designates a back focal length of the lens system.

19. An image pickup system equipped with a lens system as claimed in claim 15.

20. A wide-angle lens system according to claim 15, further comprising an exit pupil location adjuster which is composed of a positive lens element or positive lens elements and is disposed on an image side of the 3-2 subunit and which satisfies the following conditions (1-1), (2-1), (3-1), (4-1), (5-2), (6-1) and (7-1):

(1-1) $0.3<|f_1/f_3|<0.7$
(2-1) $0.03<|f/f_2|<0.6$
(3-1) $0.05<|f_1/f_{1-1}|<0.2$
(4-1) $0.8<|f_{1-2}/f_1|<0.9$
(5-2) $|f_3/f_{3-1}|<0.4$
(6-1) $0.6<|f_3/f_{3-2}|<0.85$
(7-1) $0.5<|f_P/f_3|<1.25$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$ denote focal lengths of the 1-1 subunit, the 1-2 subunit, the 3-1 subunit and the 3-2 subunit respectively, and the reference symbol $f_P$ represents focal length of the exit pupil location adjuster.

21. A wide-angle lens system which has a long back focal length, comprising, in order from an object side:

a first lens unit which has a negative power;

a second lens unit which has a positive power; and a third lens unit which has a positive power;

wherein said first lens unit comprises, in order from the object side, a 1-1 subunit which consists of a positive lens component or positive lens components, a 1-2 subunit which consists of a negative lens component or negative lens components, wherein said third lens unit comprises, in order from the object side, a 3-1 subunit which comprises at least one negative lens component, and a 3-2 subunit which comprises at least one negative lens component and has a positive power, and wherein said lens system satisfies the following conditions (1) through (6) and (12):

(1) $0.2<|f_1/f_3|<0.8$ (2) $0.01<|f/f_2|<0.7$ (3) $0.01<|f_1/f_{1-1}|<0.5$ (4) $0.7<|f_{1-2}/f_1|<1.0$ (5) $|f_3/f_{3-1}|<0.6$ (6) $0.5<|f_3/f_{3-2}|<0.95$

(12) $|f/E_X|<0.10$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$ denote focal lengths of the 1-1 subunit, the 1-2 subunit, the 3-1 subunit and the 3-2 subunit respectively, the reference symbol $e_{23}$ represents a distance between principal points of the second lens unit and the third lens unit, the reference symbol f designates a focal length of the lens system as a whole, and the reference symbol $E_X$ represents a length from an image side surface of the lens system to an exit pupil of the lens system.

22. A wide-angle lens system according to claim 3, 6 or 21, wherein said 3-1 subunit comprises, in order from the object side, a first negative lens component which consists of a negative lens element or negative lens elements and a second lens component which has a positive power as a whole.

23. A wide-angle lens system according to claim 22, wherein a lens component which has a positive power is disposed on the image side of the 3-2 subunit.

24. A wide-angle lens system according to claim 22, satisfying the following condition (8):

(8) $0.5<|e_{12}/f|<3.5$ wherein the reference symbols $e_{12}$ represents a distance between principal points of the first lens unit and the second lens unit and the reference symbol f represents a focal length of the lens system as a whole.

25. A wide-angle lens system according to claim 22, satisfying the following condition (10):

(10) $2.0<|f_B/f|<6.0$ wherein the reference symbol f represents a focal length of the lens system as a whole and wherein the reference symbol $f_B$ designated a back focal length of the lens system.

26. An image pickup system equipped with a lens system as claimed in claim 22.

27. A wide-angle lens system according to claim 22, further comprising an exit pupil location adjuster which is composed of a positive lens element or positive lens elements and is disposed on an image side of the 3-2 subunit and which satisfies the following conditions (1-1), (2-1), (3-1), (4-1), (5-2), (6-1) and (7-1):

(1-1) $0.3<|f_1/f_3|<0.7$ (2-1) $0.03<|f/f_2|<0.6$ (3-1) $0.05<|f_1/f_{1-1}|<0.2$ (4-1) $0.8<|f_{1-2}/f_1|<0.9$ (5-2) $|f_3/f_{3-1}|<0.4$ (6-1) $0.6<|f_3/f_{3-2}|<0.85$ (7-1) $0.5<|f_P/f_3|<1.25$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$ denote focal lengths of the 1-1 subunit, the 1-2 subunit, the 3-1 subunit and the 3-2 subunit respectively, and the reference symbol $f_P$ represents focal length of the exit pupil location adjuster.

28. A wide-angle lens system according to claim 1, 2, 3, 4, 5, 6, 7, 14 or 21 wherein a lens component which has a positive power is disposed on the image side of the 3-2 subunit.

29. A wide-angle lens system according to claim 1, 2, 3, 4, 5, 6, 7, 14 or 21 satisfying the following condition 8:

(8) $0.5<|e_{12}/f|<3.5$ wherein the reference symbol $e_{12}$ represents a distance between principal points of the first lens unit and the second lens unit and the reference symbol f represents a focal length of the lens system as a whole.

30. A lens system according to claim 1, 2, 3, 4, 5, 6, 7, 14 or 21 satisfying the following condition (10):

(10) $2.0<|f_B/f|<6.0$ wherein the reference symbol f represents a focal length of the lens system as a whole, and the reference symbol $f_B$ designates a back focal length of the lens system.

31. An image pickup system equipped with a lens system as claimed in claim 1, 2, 3, 4, 5, 6, 7, 14 or 21.

32. A lens system according to claim 1, 2, 3, 4, 5, 6, 7, 14 or 21 further comprising an exit pupil location adjuster which is composed of a positive lens element or positive lens elements and is disposed on an image side of the 3-2 subunit and which satisfies the following conditions (1-1), (2-1), (3-1), (4-1), (5-2), (6-1) and (7-1):

(1-1) $0.3<|f_1/f_3|<0.7$ (2-1) $0.03<|f/f_2|<0.6$ (3-1) $0.05<|f_1/f_{1-1}|<0.2$ (4-1) $0.8<|f_{1-2}/f_1|<0.9$ (5-2) $|f_3/f_{3-1}|<0.4$ (6-1) $0.6<|f_3/f_{3-2}|<0.85$ (7-1) $0.5<|f_P/f_3|<1.25$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$ denote focal lengths of the 1-1 subunit, the 1-2 subunit, the 3-1 subunit and the 3-2 subunit respectively, and the reference symbol $f_P$ represents focal length of the exit pupil location adjuster.

33. A wide-angle lens system which has a long back focal length, comprising, in order from an object side:

a first lens unit which has a negative power;

a second lens unit which has a positive power; and a third lens unit which has a positive power, wherein said first lens unit comprises, in order from the object side, a 1-1 subunit which consists of a positive lens component or positive lens components, a 1-2 subunit which consists of a negative lens component or negative lens components, wherein said third lens unit comprises, in order from the object side, a 3-1 subunit which comprises at least one negative lens component, and a 3-2 subunit which comprises at least one negative lens component and has a positive power, and wherein said lens system satisfies the following conditions (1) through (6) and (10), (11) and (12):

(1) $0.2 < |f_1/f_3| < 0.8$
(2) $0.01 < |f/f_2| < 0.7$
(3) $0.01 < |f_1/f_{1-1}| < 0.5$
(4) $0.7 < |f_{1-2}/f_1| < 1.0$
(5) $|f_3/f_{3-1}| < 0.6$
(6) $0.5 < |f_3/f_{3-2}| < 0.95$
(10) $2.0 < |f_B/f| < 6.0$
(11) $50° < 2\omega < 95°$
(12) $|f/E_X| < 0.1$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$, denote focal lengths of the 1-1 subunit, the 1-2 subunit, the 3-1 subunit and the 3-2 subunit respectively, the reference symbol $e_{23}$ represents a distance between principal points of the second lens unit and the third lens unit, the reference symbol $f_B$ designates a back focal length of a lens system, the reference symbol $2\omega$ denotes a field angle of a lens system and the reference symbol $E_X$ represents a length from an image side surface of the lens system to an exit pupil of the lens system.

34. A wide-angle lens system according to claim 33, wherein said 3-1 subunit comprises, in order from the object side, a first negative lens component which consists of a negative lens element or negative lens elements, and a second lens component which has a positive power as a whole.

35. A wide-angle lens system which has a long back focal length, comprising, in order from an object side:

a first lens unit which has a negative power as a whole;

a second lens unit which has a positive power as a whole; and a third lens unit which has a positive power as a whole, wherein said first lens unit comprises, in order from the object side, a 1-1 subunit consisting of a positive lens component or positive lens components and having a positive power, a 1-2 subunit consisting of a negative lens component or negative lens components and having a negative power, and wherein said third lens unit comprises, in order from the object side, a 3-1 subunit of said third lens unit comprising, in order from the object side, a first lens component consisting of a negative lens element or negative lens elements and having a negative power, a second lens component which has a positive power, a 3-2 subunit comprising, in order from the object side, a third lens component which has a negative power and a fourth lens component which has a positive power and satisfying the following conditions (10), (11) and (12):

(10) $2.0 < |f_B/f| < 6.0$
(11) $50° < 2\omega < 95°$
(12) $|f/E_X| < 0.1$ wherein the reference symbol f represents a focal length of the lens system as a whole, the reference symbol $f_B$ designates a back focal length of a lens system, the reference symbol $2\omega$ denotes a field angle of a lens system and the reference symbol $E_X$ represents a length from an image side surface of the lens system to an exit pupil of the lens system.

36. A wide-angle lens system which has a long back focal length, comprising, in order from an object side:

a first lens unit which has a negative power as a whole;

a second lens unit which has a positive power as a whole; and a third lens unit which has a positive power as a whole, wherein said first lens unit comprises, in order from the object side, a 1-1 subunit which consists of a positive lens component or positive lens components and has a positive power, a 1-2 subunit which consists of a negative lens component or negative lens components and has a negative power, wherein said third lens unit comprises, in order from the object side, a 3-1 subunit comprising, in order from the object side, a first lens component consisting of a negative lens element or negative lens elements and having a negative power, and a second lens component having a positive power, a 3-2 subunit comprising, in order from the object side, a third lens component which has a positive power, a fourth lens component which has a negative power, a fifth lens component which has a positive power, wherein said lens system satisfies the following conditions (1) through (6) and (10), (11) and (12):

(1) $0.2 < |f_1/f_3| < 0.8$
(2) $0.01 < |f/f_2| < 0.7$
(3) $0.01 < |f_1/f_{1-1}| < 0.5$
(4) $0.7 < |f_{1-2}/f_1| < 1.0$
(5) $|f_3/f_{3-1}| < 0.6$
(6) $0.5 < |f_3/f_{3-2}| < 0.95$
(10) $2.0 < |f_B/f| < 6.0$
(11) $50° < 2\omega < 95°$
(12) $|f/E_X| < 0.1$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$, denote focal lengths of the 1-1 subunit, the 1-2 subunit, the 3-1 subunit and the 3-2 subunit respectively, the reference symbol $e_{23}$ represents a distance between principal points of the second lens unit and the third lens unit, the reference symbol $f_B$ designates a back focal length of a lens system, the reference symbol $2\omega$ denotes a field angle of a lens system and the reference symbol $E_X$ represents a length from an image side surface of the lens system to an exit pupil of the lens system.

37. A wide-angle lens system which has a long back focal length, comprising, in order from an object side:

a first lens unit which has a negative power;

a second lens unit which has a positive power; and a third lens unit which has a positive power, wherein said first lens unit comprises, in order from the object side, a 1-1 subunit which consists of a positive lens component or positive lens components, a 1-2 subunit which consists of a negative lens component or negative lens components, wherein said third lens unit comprises, in order from the object side, a 3-1 subunit which comprises at least one negative lens component, and a 3-2 subunit which comprises at least one negative lens component and has a positive power, further comprising an exit pupil location adjuster which is composed of a positive lens element or positive lens elements and is disposed on an image side of the 3-2 subunit and wherein said lens system satisfies the following conditions (1-1), (2-1), (3-1), (4-1), (5-2), (6-1) and (7-1):

(1-1) $0.3<|f_1/f_3|<0.7$ (2-1) $0.03<|f/f_2|<0.6$ (3-1) $0.05<|f_1/f_{1-1}|<0.2$ (4-1) $0.8<|f_{1-2}/f_1|<0.9$ (5-2) $|f_3/f_{3-1}|<0.4$ (6-1) $0.6<|f_3/f_{3-2}|<0.85$ (7-1) $0.5<|f_P/f_3|<1.25$ wherein the reference symbol f represents a focal length of the lens system as a whole, the reference symbols $f_1$, $f_2$ and $f_3$ designate focal lengths of the first, second and third lens units respectively, the reference symbols $f_{1-1}$, $f_{1-2}$, $f_{3-1}$ and $f_{3-2}$ denote focal lengths of the 1-1 subunit, the 1-2 subunit, the 3-1 subunit and the 3-2 subunit respectively, and the reference symbol $f_P$ represents focal length of the exit pupil location adjuster.

38. A wide-angle lens system according to claim 37, wherein said 3-1 subunit comprises, in order from the object side, a first negative lens component which consists of a negative lens element or negative lens elements, and a second lens component which has a positive power as a whole.

* * * * *